United States Patent [19]
Rautalahti et al.

[11] 3,830,689
[45] Aug. 20, 1974

[54] SEPARATE IMPREGNATION AND COMMON DIGESTION OF DIFFERENT WOODEN RAW MATERIALS

[75] Inventors: Pentti Rautalahti; Jyrki Kettunen, both of Kirkniemi; Olavi Sonni, Aanekoski, all of Finland

[73] Assignee: Metsaluton Selluloosa Oy, Kirkniemi, Finland

[22] Filed: Sept. 27, 1971

[21] Appl. No.: 184,257

Related U.S. Application Data

[63] Continuation-in-part of Ser. No. 877,417, Nov. 17, 1969, abandoned.

[30] Foreign Application Priority Data
Nov. 19, 1968 Finland .............................. 3310/68

[52] U.S. Cl. .................................... 162/61, 162/86
[51] Int. Cl. .......................... D21c 3/02, D21c 3/12
[58] Field of Search ............ 162/55, 61, 70, 82, 83, 162/86

[56] References Cited
UNITED STATES PATENTS

| | | | |
|---|---|---|---|
| 3,354,030 | 11/1967 | Williams et al. | 162/86 |
| 3,367,495 | 2/1968 | Lea et al. | 162/55 X |
| 3,578,554 | 5/1971 | Richter | 162/55 X |

OTHER PUBLICATIONS
Rydholm, Pulping Processes, pgs. 549 & 671, 1965, (GP 170).

*Primary Examiner*—S. Leon Bashore
*Assistant Examiner*—Arthur L. Corbin

[57] ABSTRACT

Each of at least two different wooden raw material portions are separately impregnated with separate wood cooking solutions differing in strength and pH after which excess cooking solution is withdrawn from each raw material portion and the separately impregnated raw material portions are cooked together in a single steam phase cooking step.

4 Claims, No Drawings

SEPARATE IMPREGNATION AND COMMON DIGESTION OF DIFFERENT WOODEN RAW MATERIALS

CROSS-REFERENCE TO RELATED APPLICATION

This application is a continuation-in-part application of our prior co-pending application Ser. No. 877,417, filed Nov. 17, 1969, now abandoned.

BACKGROUND OF THE INVENTION

1. Field of the Invention

The invention relates to a method of manufacturing pulp, and especially to a method in which the wooden raw material is preimpregnated before cooking.

2. Description of the Prior Art

In recent high-yield processes of pulp production, it has been found best to treat each type of raw materials with its own cooking process. There is a very clear difference in this respect between deciduous and coniferous woods. If the mill wishes to use a wide range of raw materials, it must either resort to consecutive bath production, which is highly inconvenient for integration, or invest in several cooking lines. In the United States it has been endeavoured to solve the problem by means of cocktail cooking, but this does not give the best results as regards product quality and raw-material utilization.

The latest answer to the problem is to impregnate the chemicals with the raw material in the process steps preceding the reactor, and perform the cooking itself in a continuous steam phase reactor.

SUMMARY OF THE INVENTION

According to the invention the wooden raw material to be processed is divided into two or more portions which are impregnated separately, and/or different raw materials are impregnated separately with a cooking liquor, whereafter the separately impregnated portions are cooked together in a steam phase.

The invention offers a especially advantageous method of pulp production that will lead to the best possible result as regards both product quality and raw-material utilization, irrespective of the composition of the raw material.

The principal characteristics of the invention are that the wooden raw material is divided into two or more parts, which are impregnated separately with the cooking solution before cooking, and/or that different wooden raw materials are impregnated separately. Then surplus impregnating solutions are withdrawn and the parts that have been impregnated separately are cooked together in a steam phase.

According to the invention, each raw material is impregnated separately with its own cooking solution and all are cooked in a single continuous reactor. The cooking speeds of the different materials are rendered uniform by regulating the pH values and strengths of the impregnation solutions. The method can also be modified by treating the same raw material in different ratios in parallel impregnation lines and taking the impregnated materials on to a single steam phase reactor. This enables a given raw material to be converted into the optimum quality for the purpose intended.

BRIEF DESCRIPTION OF THE PREFERRED EMBODIMENTS

Example 1. Fluting. Raw materials: 80 percent pine, 20 percent birch.

Conditions. Pine: impregnation solution sodium bisulphite, pH 4.5. Solution strength and conditions of impregnation regulated so that the chemical dose is 8 percent $SO_2$ per kg of abs. dry wood.

Birch: impregnation solution carbonate-buffered sodium sulphite, pH 8.5. Impregnation conditions and strength of impregnation solution regulated to yield 6 percent $SO_2$ per kg of abs. dry wood.

After separate impregnation, they are cooked together in a steam phase. Cooking temperature 165° C, duration 20 min. The result is a mixture in which the birch yield and properties correspond to those obtained in a separate NSSC process, while the pine yield is slightly higher than in a pure bisulphite process, though clearly lower than if it had been cooked in a neutral sulphite process. The cardboard properties of the pulp correspond to those obtained in similar but separate cooking.

Example 2. Fluting. Raw materials and ratio the same as in Example 1.

Conditions. Pine: impregnation solution ammonium bisulphite, pH 4.0. The impregnation solution strength and conditions are regulated to obtain 8 percent $SO_2$ per kg of abs. dry wood.

Birch: the impregnation solution was ammonia buffered ammonium sulphite having a pH of 8.5.

Cooked together for 25 minutes at a temperature of 160° C, the two materials give a combined yield of about 83 percent (pine 80 percent, birch 84 percent). The quality of the product is up to that of the best mixture of birch NSSC and sulphate twig pulp cooked separately. Laboratory (concora medium) tests have shown that, at a given beating stage, the consistency of the cooking mixture is stiffer than after separate cooking of pulps beaten either together or separately. The same applies to porosity and bulk. The level of beating reaction achieved by cooking together pulps impregnated separately is similar to that of birch pulp cooked separately under corresponding conditions.

Example 3. Semi-chemical pulp for newsprint. Raw materials: 80 percent pine, 20 percent birch.

Conditions. Pine: impregnation solution and chemical doses as in Example 1.

Birch: impregnation solution and chemical doses as in Example 1.

Cooked together in steam phase for 40 min. at 160° C. Pulp yield similar to that of pure pine bisulphite process under the same conditions. Pulp properties similar to those of a mixture of pine sulphite and birch neutral sulphite mixed in the same ratio but cooked separately.

Example 4. Raw materials: pine sawdust and pine chips in various ratios. The sawdust and the chips are introduced to separate impregnators. The impregnation medium used in both impregnators is an ordinary sulphite cooking liquor. After the pine chips have been impregnated with the sulphite cooking liquor excess liquor is used for the impregnation of the sawdust. Consequently the second impregnation liquor has a lower concentration to provide a suitable alkali dose for the sawdust.

The separately impregnated chips and sawdust are cooked together in a steam phase in a common reactor. This procedure offers the possibility of cooking a more uniform pulp from sawdust and chips compared to prior known methods wherein the raw materials are mixed before impregnation. Another advantage is the possibility of utilizing impregnators of different type for both of the raw materials. For sawdust for instance, it is advantageous to utilize the recently developed Kamyr impregnators, whereas the chips are better impregnated by means of e.g. the M & D-reactor, which can be connected to the digester.

Example 5. Pulp mixture for kraft paper. Raw materials: 70 percent pine and 30 percent birch chips.

Conditions: Pine chips are impregnated with a commercial white liquor having a sulphidity of 30 percent. Solution strength and conditions of impregnation are regulated so that 20 percent active $Na_2O$ remains in the chips after withdrawing excess liquor. Birch chips are impregnated with a white liquor of the same sulphidity, but the solution strength and conditions of impregnation are regulated so that 16 percent active $Na_2O$ remains in the chips after the withdrawal of excess liquor.

Following separate impregnation, the pine and the birch chips are cooked together in a steam phase at 165° C for 45 minutes. The resulting pulp mixture, where pine pulp has a kappa number about 30 and birch pulp about 20, has paper-making properties closely similar to those obtained by mixing separatively cooked pine and birch kraft pulps in corresponding ratio.

Example 6. Semichemical pulp mixture for fluting. Raw material 80 percent birch chips and 20 percent pine sawdust.

Conditions: Birch chips are impregnated with ammonia-buffered ammonium sulphite, pH 8.5. Solution strength and conditions of impregnation are regulated so that 6 percent $SO_2$ remains in the chips after withdrawal of excess liquor. Pine sawdust is impregnated with ammonia-buffered ammonium sulphite, pH 8.5, too, but the solution strength and the conditions of impregnation are regulated so that 12 percent $SO_2$ remains in the sawdust after withdrawal of excess liquor. The separately impregnated birch and pine sawdust are steam phase cooked together at 165° C for 20 minutes. The resulting pulp mixture has closely the same board-making properties as a semichemical pulp obtained by cooking pure birch chips under corresponding conditions.

Example 7. Special pulp for fluting. Raw materials: 100 percent birch chips.

Conditions: 30 percent of the chips are impregnated with sodium bisulphite, pH 4.5. Solution strength and conditions are regulated so that 12 percent $SO_2$ remains in the chips after withdrawal of excess liquor. 70 percent of the chips are impregnated with carbonate-buffered sodium sulphite, pH 8.5. Solution strength and conditions of impregnation are regulated so that 6 percent $SO_2$ remains in the chips after withdrawal of excess liquor.

The separately impregnated chips are steam phase cooked together at 165° C for 20 minutes. The resulting pulp mixture is suitable for fluting without any softwood pulp to improve the runnability of the board.

Example 8. Bisulphite pulp. Raw materials 50 percent spruce and 50 percent pine chips.

Conditions: Spruce chips are impregnated with magnesium bisulphite, pH 4.0. Solution strength and conditions of impregnation are regulated so that 14 percent $SO_2$ remains in the chips after withdrawal of the excess liquor. Pine chips are impregnated with magnesium bisulphite, pH 4.0, too, but the solution strength and the conditions of impregnation are regulated so that 16 percent $SO_2$ remains in the chips after withdrawal of the excess liquor.

The separately impregnated spruce and pine chips are steam phase cooked at 160° C for 60 minutes. This procedure yields a considerable more uniform and brighter bisulphite pulp compared with a pulp obtained by a conventional bisulphite having the same composition of pine and spruce chips. This is due to the fact that pine tends to digest at a slower rate than spruce under the same conditions.

What is claimed is:

1. In a method of manufacturing pulp from at least two portions of subdivided raw wooden material each portion differing from each other portion in at least one characteristic as to size, form and specie, the improvement which consists of the steps of separately impregnating each of said at least two portions of raw wooden materials with separate wood cooking solutions having different strengths and pH values suitable for obtaining the desired pulp from the portion so impregnated, withdrawing excess cooking solution from each impregnated portion and finally cooking together the separately impregnated portions in a single steam phase cooking step, whereby each particle of subdivided raw wooden material is cooked with its own impregnated cooking solution and wherein said different strengths and pH values provide a uniform cooking speed of the separately impregnated portions when cooked together.

2. The method of claim 1, wherein the raw materials are about 80 percent pine and about 20 percent birch and said pine is impregnated with a solution of sodium bisulphite and said birch is impregnated with a solution of carbonate-buffered sodium sulphite.

3. The method of claim 2, wherein said sodium bisulphite solution has a pH of about 4.5 and said carbonate-buffered sodium sulphite solution has a pH of about 8.5.

4. The method of claim 1, wherein said cooking is at a temperature of from about 160° C to about 165° C for a period of from about 20 minutes to about 60 minutes.

* * * * *